United States Patent
Liu et al.

(10) Patent No.: US 11,682,210 B1
(45) Date of Patent: Jun. 20, 2023

(54) METHODS AND DEVICE FOR VIDEO DATA ANALYSIS

(71) Applicant: KWAI INC., Palo Alto, CA (US)

(72) Inventors: Jiayi Liu, Fremont, CA (US); Huayan Wang, Palo Alto, CA (US); Xin Miao, Palo Alto, CA (US)

(73) Assignee: Kwai Inc., Palo Alto, CA (US)

( * ) Notice: Subject to any disclaimer, the term of this patent is extended or adjusted under 35 U.S.C. 154(b) by 0 days.

(21) Appl. No.: 17/538,743

(22) Filed: Nov. 30, 2021

(51) Int. Cl.
  *G06V 20/40* (2022.01)
  *H04N 21/84* (2011.01)
(52) U.S. Cl.
  CPC .............. *G06V 20/47* (2022.01); *G06V 20/41* (2022.01); *H04N 21/84* (2013.01)
(58) Field of Classification Search
  CPC ......... G06V 20/47; G06V 20/41; H04N 21/84
  See application file for complete search history.

(56) References Cited

U.S. PATENT DOCUMENTS

| | | | |
|---|---|---|---|
| 7,734,775 B2 | 6/2010 | Barnett et al. | |
| 9,060,106 B1 * | 6/2015 | Wu | G06T 7/11 |
| 9,678,850 B1 | 6/2017 | Rickard et al. | |
| 2009/0083814 A1 * | 3/2009 | Sekine | H04N 21/84 |
| | | | 725/104 |
| 2014/0328570 A1 * | 11/2014 | Cheng | H04N 21/8549 |
| | | | 386/241 |
| 2016/0098037 A1 | 4/2016 | Zornio et al. | |
| 2017/0097950 A1 | 4/2017 | Meacham et al. | |
| 2017/0177263 A1 | 6/2017 | Das et al. | |
| 2018/0113577 A1 * | 4/2018 | Burns | H04N 21/8549 |
| 2018/0115592 A1 * | 4/2018 | Samineni | H04N 21/4667 |

FOREIGN PATENT DOCUMENTS

WO  2019245618 A1  12/2019

* cited by examiner

*Primary Examiner* — Mishawn N. Hunter
(74) *Attorney, Agent, or Firm* — Arch & Lake LLP (57) ABSTRACT

Methods and apparatuses are provided for movie and television series video data analysis. The method includes: gathering and reading, by a processor, a plurality of input movies; removing a video border of each input movie; splitting the input movie into short clips, based on accuracy and efficiency requirements of different analyzing models; assessing attributes of each input movie by analyzing, with the different analyzing models, the input movie, the short clips cut from the input movie, and the frame images extracted from the input movie; and summarizing the plurality of input movies based on matching and integrating the attributes assessed for each input movie.

18 Claims, 5 Drawing Sheets

METHODS AND DEVICE FOR VIDEO DATA ANALYSIS

FIELD

The present application generally relates to video data analysis, and in particular but not limited to, methods and apparatuses for video data analysis for movies and TV dramas.

BACKGROUND

The rapid development of short video platforms has provided opportunities for everyone to become short video creators. However, it requires a wealth of skills for someone to be a director and to complete the shooting of an outstanding video. It becomes a key challenge for the development of short video platforms that how to use AI to understand the creative methods of excellent videos, and then to provide the general public with shooting guidance to allow more people to participate in the process of creating short videos. Film and television dramas shot by professional directors have become an excellent source for our algorithm to learn shooting techniques.

SUMMARY

In general, this disclosure describes examples of techniques relating to video data analysis for movies and TV dramas.

According to a first aspect of the present disclosure, a method for movie and television series video data analysis is provided. The method includes: gathering and reading, by a processor, a plurality of input movies; removing a video border of each input movie; splitting the input movie into short clips, based on accuracy and efficiency requirements of different analyzing models; assessing attributes of each input movie by analyzing, with the different analyzing models, the input movie, the short clips cut from the input movie, and the frame images extracted from the input movie; and summarizing the plurality of input movies based on matching and integrating the attributes assessed for each input movie.

According to a second aspect of the present disclosure, an apparatus is provided for implementing a method for movie and television series video data analysis, including: one or more processors; and a memory configured to store instructions executable by the one or more processors; where the one or more processors, upon execution of the instructions, are configured to: gather and read, by the one or more processors, a plurality of input movies; remove a video border of each input movie; split the input movie into short clips, based on accuracy and efficiency requirements of different analyzing models; extract, from the plurality of input movies, frame images according a preset frame extracting rate; assess attributes of each input movie by analyzing, with the different analyzing models, the input movie, the short clips cut from the input movie, and the frame images extracted from the input movie; and summarize the plurality of input movies based on matching and integrating the attributes assessed for each input movie.

According to a third aspect of the present disclosure, a non-transitory computer readable storage medium is provided, including instructions stored therein, where, upon execution of the instructions by one or more processors, the instructions cause the one or more processors to perform acts including: gathering and reading, by a processor, a plurality of input movies; removing a video border of each input movie; splitting the input movie into short clips, based on accuracy and efficiency requirements of different analyzing models; assessing attributes of each input movie by analyzing, with the different analyzing models, the input movie, the short clips cut from the input movie, and the frame images extracted from the input movie; and summarizing the plurality of input movies based on matching and integrating the attributes assessed for each input movie.

It is to be understood that both the foregoing general description and the following detailed description are exemplary and explanatory only and are not restrictive of the present disclosure.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

There are many methods or technologies to extract the basic attributes of character in images and videos (such as face detection, key point detection, behavior detection, etc.). In terms of cinematic language, with a data set of video shot clips and labels, the algorithm can classify the camera scale and movement of video clips. It can realize the important segmentation of long videos. However, it may just analyze a certain attribute of the image and video separately. No efficient pipeline platform has been provided to extract all the video attributes uniformly, and align the attribute formats to generate a concise unified output. Such methods may not be developed for analyzing film and television drama data, and thus the attributes extracted may not directly help downstream video production or development.

Film and television dramas shot by professional directors are an excellent source for an AI algorithm to learn shooting techniques for short video creation. Generally speaking, in order to learn shooting techniques from existing videos, the first step would be to disassemble, extract and analyze the data of film and television dramas. Movie and television series data analysis pipeline may effectively disassemble movie and television series fragments, extract the basic shooting attributes of the shots, the basic attributes of the characters in the fragments, and effectively analyze and match the attributes. Such analysis result may provide effective basic support for subsequent analysis with other algorithms.

Figure 1:
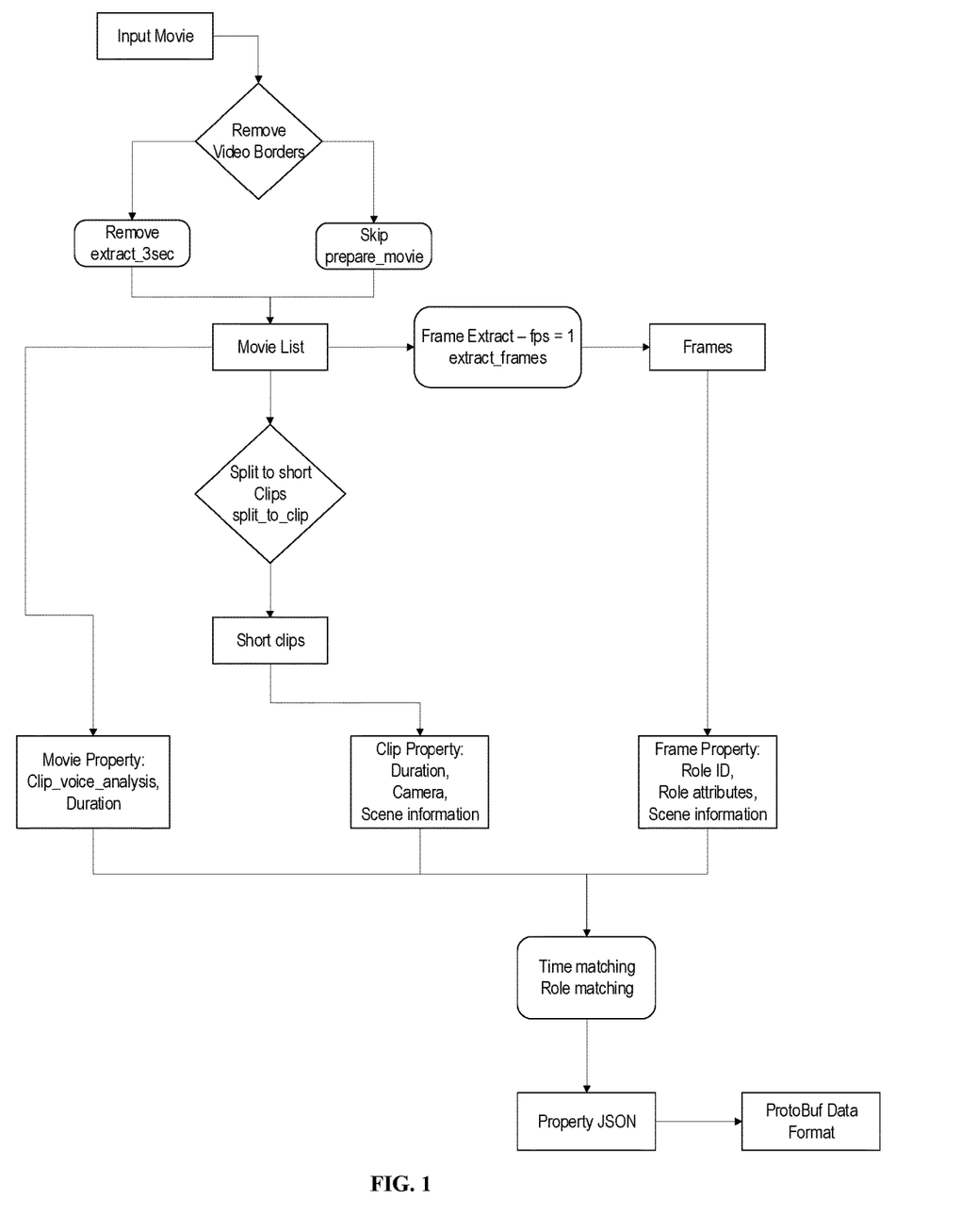
FIG. 1 is a flow diagram illustrating an exemplary data pipeline in accordance with one or more examples of the present disclosure.

FIG. 1 illustrates a flow diagram of an exemplary data pipeline according to one or more examples of the present disclosure. At the starting point, various movies may be chosen as input movies for the data pipeline. In the next step, whether the input movies include video borders and whether such video borders need to be removed are determined. After this preliminary processing, a list of input movies is generated. The input movies are further prepared and processed in three levels of analysis. First, the input movies are to be assessed at the entire movie level, and properties of the movie are analyzed with some dedicated models. Second, the input movies are to be split into short video clips with different methods and models, and properties and attributes of the short video clips are further analyzed. At the third level, still frame pictures of the input movies are extracted, and properties of frame images are assessed with their designated models.

Subsequently, such movie properties, clip properties and frame properties may be summarized and matched based on the timing information and character/role information of the input movies. The data obtained from the summary of various properties of the input movie may be in the JSON format and may be converted into the ProtoBuf format for following transmission.

Figure 2:
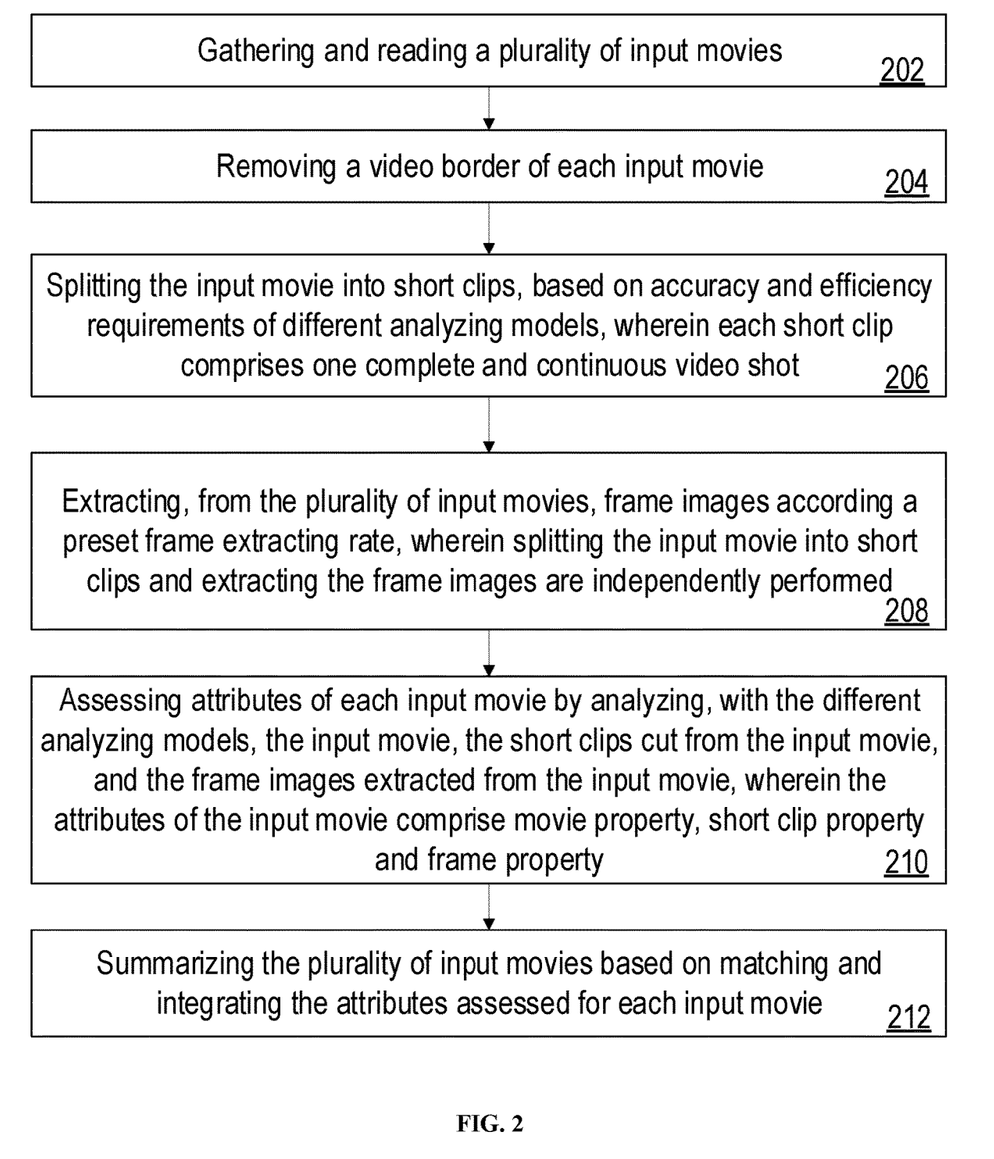
FIG. 2 is a flow diagram illustrating exemplary video data analysis process for movie and television drama in accordance with one or more examples of the present disclosure.

FIG. 2 is a flow diagram illustrating exemplary process of video data analysis for movie and television drama in accordance with some examples of the present disclosure.

In Step 202, a plurality of input movies or videos are gathered by a processor, and the input movies and videos gathered are further read by the processor. To process a larger number of videos more effectively, multiple movies or long videos may be computed or processed parallelly, such that manual intervention in the calculation process may be reduced.

In Step 204, video borders of each input movies or videos gathered in step 202 are removed. Video borders are usually added, during the film post production, to transform film shot in a widescreen aspect ratio to standard-width video formats while preserving the film's original aspect ratio.

Such video borders possess no shooting or production information or attributes to be analyzed, and thus such borders need to be removed before performing further analysis. Some dedicated machine learning models, such as extract 3 sec, may be used to remove the video borders.

Figure 3:
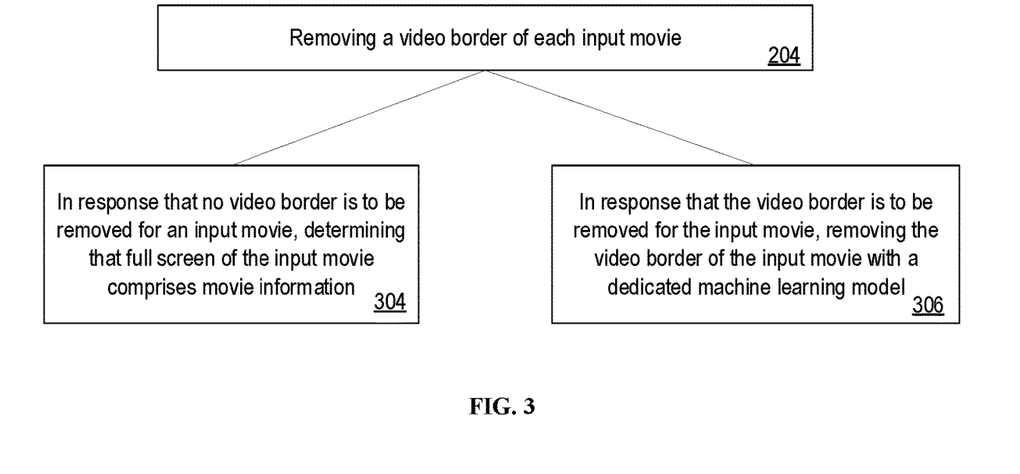
FIG. 3 is a flow diagram illustrating additional steps in the exemplary video data analysis process for movie and television drama in accordance with some examples of the present disclosure.

As shown in FIG. 3, in some examples of the present disclosure, the step of removing video borders may be further split. When the processor determines that video borders need to be removed from the gathered input videos, the video border of each input video may be removed by the dedicated machine learning model, as in step 306. In some other cases like step 304, when no video border is detected in the input video gathered, no border removal is necessary, and the processor may determine that the full screen of such input movie contain movie information for further analysis by default.

In Step 206, the input movies are split into various short video clips. Since different subsequent analysis models require different accuracies and calculation efficiencies, input videos gathered and prepared in steps 202 and 204 are further divided into short clips. Such division may be performed based on the needs of the subsequent analysis models for the videos, such as different requirements for calculation accuracy and efficiency.

The long input videos may also be cut based on the length of a video shot. In video production, a shot is the moment that the camera starts rolling until the moment it stops. In video editing, a shot is the continuous footage or sequence between two edits or cuts. Each one of the short clips cut from the long input videos may contain only one complete and continuous video shot.

In Step 208, individual frame images are extracted from the input movies. A frame image is one of the many still images which compose the complete moving picture of a video. Frame images may be extracted from the long input movies based on some preset extracting rates, such as one frame per second, etc.

Step 208 may be performed parallelly to step 206, and they may be performed independently at the same time without interfering with each other.

Steps 202-208 help to prepare the input data/videos/pictures for the subsequent attribute analysis models. Unified processing flow may help to simplify the process and lower the cost for data preparation.

In step 210, various attributes of the input movies are analyzed by different analyzing models. Some attributes are analyzed based on the whole input movie; some of the attributes are analyzed from the short clips cut from the input movie; and some other attributes are assessed based on the frame images extracted from the input movie. The analysis and calculation of attributes are based on the extraction of information from the data, statistical analysis models and deep learning models.

The attributes of the input movie include movie property, short clip property and frame property, based on what such attribute is assessed from. For example, movie properties describe the attributes of the whole input movie; short clip properties present attributes extracted from the short clips; and frame properties show the attributes of individual still frame images.

Movie properties may include title of the movie, frame rate, duration of the movie, voice detection for the movie, etc. Short clip properties may include short clip length, starting time, camera movement, camera scale, vocal detection, brightness of picture, color temperature of picture, classification of scene location, classification of scene sentiment, optical flow of key character or background, etc. Frame properties may include scene sentiment, identity of character, facial expression of the character, facial landmarks of the character, human body landmarks of the character, action detection, human body segmentation of the character, etc.

A list of the properties and attributes assessed in with the model is presented as below:

| Level | Property List |
| --- | --- |
| Frame/Clip (averaged from frames) | Brightness of image frame |
| Frame/Clip (averaged from frames) | Color temperature of image frame |
| Clip | Optical flow of object/background in a video clip |
| Frame | Human action |
| Frame | Human bounding box |
| Frame | Human composition in image frame |
| Frame | Human pose landmarks |
| Frame | Human segmentation mask |
| Frame | Role ID |
| Frame | Role emotion |
| Frame | Role face bounding box |
| Frame | Role facing direction |
| Frame/Clip (averaged from frames) | Scene sentiment |
| Frame/Clip (averaged from frames) | Scene place classification |
| Clip | Shot camera scale |
| Clip | Shot camera movement |
| Clip/Movie | Voice detection |
| Clip/Movie | Background music detection |
| Clip/Movie | Duration |
| Movie | Frame rate (FPS) |
| Movie | Meta information: title, summary, cast. |

Among the above attributes, some attributes, such as movie name, duration, frame rate, etc., only needs to be extracted from the existing information in the data. The brightness and color temperature of the picture may be obtained based on the mathematical statistics of picture pixels. Other attributes may be obtained from the analysis of corresponding deep learning models.

Figure 4:
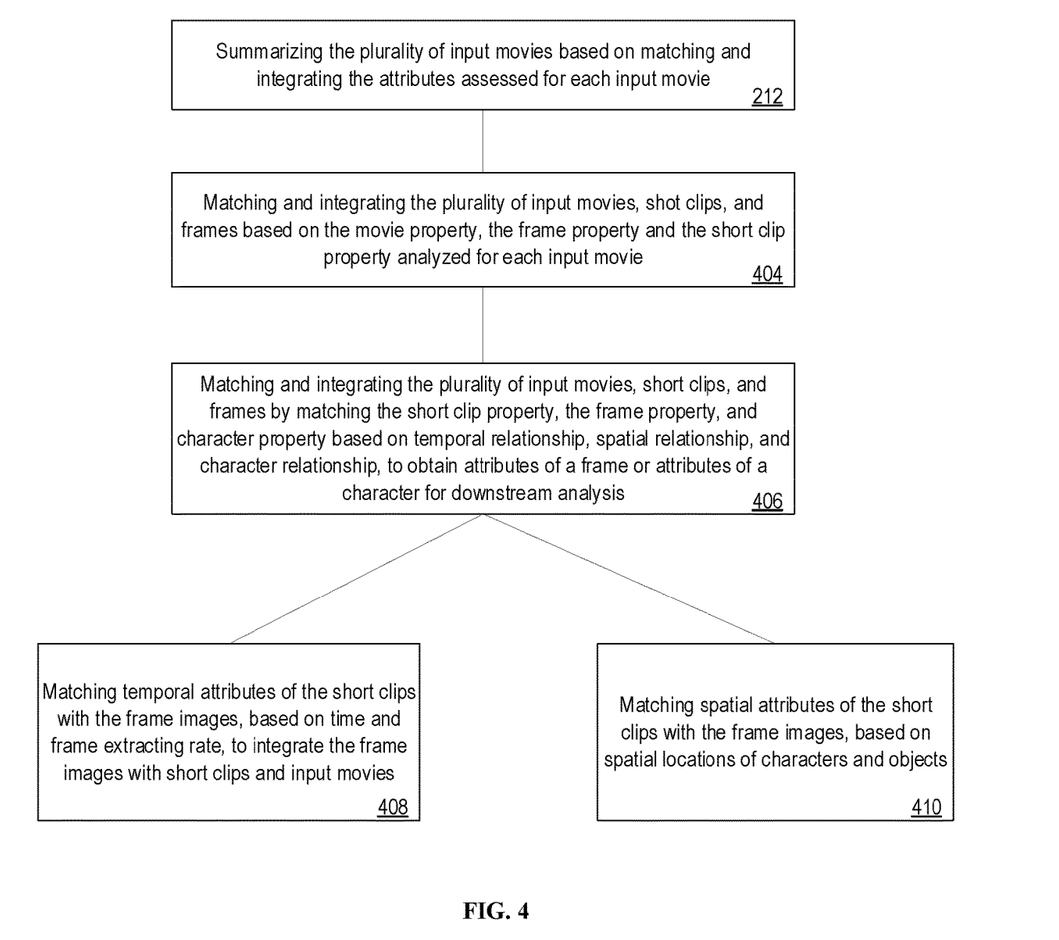
FIG. 4 is a flow diagram illustrating additional steps in the exemplary video data analysis process for movie and television drama in accordance with some examples of the present disclosure.

In step 212, various input movies are summarized based on matching and integrating the attributes assessed as in step 210 for each input movie. FIG. 4 shows some additional steps for matching and integrating these attributes for the input movies according to some examples of the present disclosure.

Various attributes of the input movies, short clips, frame pictures, as well as some characters attributes, are integrated. The short clip property, the frame property, and character property are matched and integrated based on their temporal relationship, spatial relationship, and character relationship, and then the various input movies, short clips, and frames may be matched and integrated. Downstream analysis work can directly obtain the attributes of a given moment, or the attributes of a specific character from such summary of the input movies.

Specifically, in the time dimension, as in step 408, the attributes of the short videos and the framed pictures may be matched according to the time and the frame rate, so as to integrate the attributes of a single frame with the video clip to which it belongs. In the spatial dimension, as in step 410, different attributes (such as landmarks of the body of a character and landmarks of the face of a character) according to the spatial position of the characters.

In some simple cases, when there are common landmarks between the short clips and the frame images, nearest neighbor algorithm may be used to match the spatial attributes of the short clips with the frame images. For the case where there is no landmark but only the detection area, for example, human body recognition and face recognition correspond to two different rectangular detection areas, the two overlapping area may be calculated. The ratio between the overlapping area and the rectangular detection area of the face may be calculated to determine the closest match between the character body and the face. Such that, different characters and related attributes in each frame may have a clear correspondence. In these steps, different attributes are automatically matched and integrated, which greatly reduces the workload of post-processing data analysis.

The methods in the present disclosure may provide data analysis support to help better understand the shooting of film and television dramas. The data analysis pipeline platform of film and television dramas can disassemble video data such as movies and TV dramas, extract the director's shooting methods, the basic attributes of the camera shot, and the attributes of the characters in the video. Such data may be used in subsequent algorithms for further analysis.

Such steps may simplify the process of dismantling and processing different attributes of movies or TV dramas. For each existing attribute model, the algorithm on the film and television drama data can be verified, and an algorithm that can stably output accurate results may be selected and added to the data analysis pipeline. In the platform, different algorithm models for the same attribute may also exist, so users can choose their own plan for data extraction according to the trade-off of accuracy and time.

In the examples of the present disclosure, various data and attributes may be extracted from three levels of sources: long videos, short clips, and frame pictures. Full analysis of the film and TV dramas can thus be achieved. Such pipeline platform may not only extract data, but also efficiently align the data to facilitate the use and development of subsequent projects.

Examples of the present disclosure may simplify the work for users who look for models and build processing procedures for video analysis by themselves. Through the configuration file, the user may choose to extract a single or some of the attributes of a film or a television drama. It provides some flexibilities for users to extract data. In addition, when computing resources allow, parallel computing can be automatically performed. Subsequently, Protobuf may be used for unified and efficient data transmission and exchange of the extracted and matched data.

Figure 5:
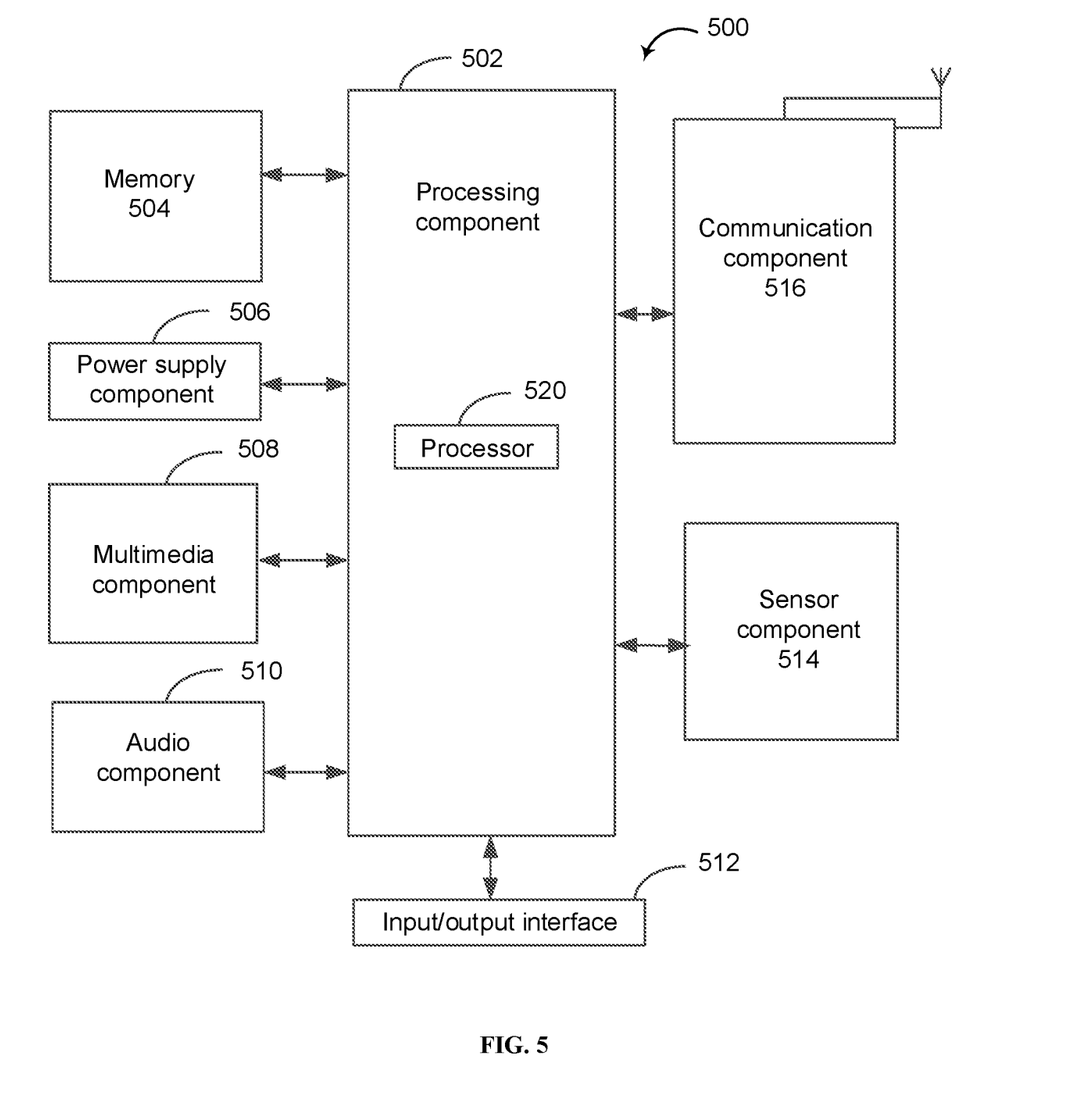
FIG. 5 is a block diagram illustrating an exemplary apparatus for movie and television series video data analysis in accordance with some implementations of the present disclosure.

FIG. 5 is a block diagram illustrating an exemplary apparatus for movie and television series video data analysis in accordance with some implementations of the present disclosure. The apparatus 500 may be an edge device, such as a terminal, a mobile phone, a tablet computer, a digital broadcast terminal, a tablet device, a personal digital assistant, or any computing device including one or more processors.

As shown in FIG. 5, the apparatus 500 may include one or more of the following components: a processing component 502, a memory 504, a power supply component 506, a multimedia component 508, an audio component 510, an input/output (I/O) interface 512, a sensor component 514, and a communication component 516.

The processing component 502 usually controls overall operations of the apparatus 500, such as operations relating to display, a telephone call, data communication, a camera operation and a recording operation. The processing component 502 may include one or more processors 520 for executing instructions to complete all or a part of steps of the above method. Further, the processing component 502 may include one or more modules to facilitate interaction between the processing component 502 and other components. For example, the processing component 502 may include a multimedia module to facilitate the interaction between the multimedia component 508 and the processing component 502. The one or more processors 520 may include one or more of following processors: a central processing unit (CPU), a graphic processing unit (GPU), etc.

The memory 504 is configured to store different types of data to support operations of the apparatus 500. Examples of such data include instructions, contact data, phonebook data, messages, pictures, videos, and so on for any application or method that operates on the apparatus 500. The memory 504 may be implemented by any type of volatile or non-volatile storage devices or a combination thereof, and the memory 504 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 506 supplies power for different components of the apparatus 500. The power supply component 506 may include a power supply management system, one or more power supplies, and other components associated with generating, managing and distributing power for the apparatus 500.

The multimedia component 508 includes a screen providing an output interface between the apparatus 500 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 508 may include a front camera and/or a rear camera. When the apparatus 500 is in an operation mode, such as a shooting mode or a video mode, the front camera and/or the rear camera may receive external multimedia data.

The audio component 510 is configured to output and/or input an audio signal. For example, the audio component 510 includes a microphone (MIC). When the apparatus 500 is in an operating mode, such as a call mode, a recording mode and a voice recognition mode, the microphone is configured to receive an external audio signal. The received audio signal may be further stored in the memory 504 or sent via the communication component 516. In some examples, the audio component 510 further includes a speaker for outputting an audio signal.

The I/O interface 512 provides an interface between the processing component 502 and a peripheral interface module. The above peripheral interface module may be a keyboard, a click wheel, a button, or the like. These buttons may include but not limited to, a home button, a volume button, a start button and a lock button.

The sensor component 514 includes one or more sensors for providing a state assessment in different aspects for the apparatus 500. For example, the sensor component 514 may detect an on/off state of the apparatus 500 and relative locations of components. For example, the components are a display and a keypad of the apparatus 500. The sensor component 514 may also detect a position change of the apparatus 500 or a component of the apparatus 500, presence or absence of a contact of a user on the apparatus 500, an orientation or acceleration/deceleration of the apparatus 500, and a temperature change of apparatus 500. The sensor component 514 may include a proximity sensor configured to detect presence of a nearby object without any physical touch. The sensor component 514 may further include an optical sensor, such as a CMOS or CCD image sensor used in an imaging application. In some examples, the sensor component 514 may further include an acceleration sensor, a gyroscope sensor, a magnetic sensor, a pressure sensor, or a temperature sensor.

The communication component 516 is configured to facilitate wired or wireless communication between the apparatus 500 and other devices. The apparatus 500 may access a wireless network based on a communication standard, such as WiFi, 4G, or a combination thereof. In an example, the communication component 516 receives a broadcast signal or broadcast related information from an external broadcast management system via a broadcast channel. In an example, the communication component 516 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 500 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc. The storage medium may be used to store or buffer data, network, and parameters.

As shown in the flowchart of FIG. 2, the exemplary video data analysis process for movie and television drama may be implemented in accordance with some examples of the present disclosure.

In step 202, the processor 520 gathers and reads a plurality of input movies or videos. A number of different movies or videos may be gathered and read by the processor at the same time, depending on the efficiency and capacity of the processor.

In step 204, the processor 520 removes video borders of each input movies or videos, since such video borders contain no information or data for subsequent analysis. When the processor 520 determines that video borders need to be removed from the gathered input videos, the video border of each input video may be removed by the dedicated machine learning model, such as extract_3sec. When no video border is detected in the input video gathered, no border removal is necessary, and the processor 520 determines that the full screen of such input movie contain movie information for further analysis by default.

In step 206, the processor 520 split the input movies into various short video clips. The processor 520 may split and divide the input movies based on the needs of the subsequent analysis models for the videos, for example, based on different requirements for calculation accuracy and efficiency.

In step 208, the processor 520 extracts individual frame images from the input movies. The processor 520 extracts still frame images from the long input movies based on some preset extracting rates, and the processor 520 may perform the split of step 206 and the extraction of step 208 parallelly without interfering with each other.

In step 210, the processor 520 analyzes a number of different attributes of the input movies by analyzing the whole input movie, the short clips cut from the input movie, and the frame images extracted from the movie. The processor 520 analyzes the whole input movie to receive the movie property, analyzes the short clips to receive short clip property, and analyzes the frame images to get frame property.

In step 212, the processor 520 summarizes the plurality of input movies based on matching and integrating the attributes assessed as in step 210. The processor 520 matches and integrates various attributes of the input movies, short clips, and frame pictures. The processor 520 matches and integrates the short clip property, the frame property, and character property based on their temporal relationship, spatial relationship, and character relationship.

In some examples, an apparatus for video data analysis is provided. The apparatus includes one or more processors 520; and a memory 504 configured to store instructions executable by the one or more processors; where the one or more processors, upon execution of the instructions, are configured to perform a method as illustrated in FIG. 2.

In some other examples, there is provided a non-transitory computer readable storage medium 504, having instructions stored therein. When the instructions are executed by one or more processors 520, the instructions cause the processors to perform a method as illustrated in FIG. 2.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for movie and television series video data analysis, comprising:
    gathering and reading, by a processor, a plurality of input movies;
    removing a video border of each input movie,
        wherein removing the video border of each input movie further comprises:
            in response that no video border is to be removed for an input movie, determining, by default, that full screen of the input movie comprises movie information; or
            in response that the video border is to be removed for the input movie, removing the video border of the input movie with a dedicated machine learning model;
    splitting the input movie into short clips, based on accuracy and efficiency requirements of different analyzing models, wherein each short clip comprises one complete and continuous video shot;
    extracting, from the plurality of input movies, frame images according a preset frame extracting rate, wherein splitting the input movie into short clips and extracting the frame images are independently performed;
    assessing attributes of each input movie by analyzing, with the different analyzing models, the input movie, the short clips cut from the input movie, and the frame images extracted from the input movie, wherein the attributes of the input movie comprise movie property, short clip property and frame property; and
    summarizing the plurality of input movies based on matching and integrating the attributes assessed for each input movie.

2. The method of claim 1, wherein the different analyzing models comprises statistical analysis models or deep learning models.

3. The method of claim 1, wherein the movie property comprises movie title, frame rate, movie duration, or voice detection;
    the short clip property comprises short clip length, starting time, camera movement, camera scale, vocal detection, brightness of picture, color temperature of picture, classification of scene location, classification of scene sentiment, or optical flow of key character or background; and
    the frame property comprises scene sentiment, identity of character, facial expression of the character, facial landmarks of the character, human body landmarks of the character, action detection, or human body segmentation of the character.

4. The method of claim 3, wherein the movie title, the frame rate, and the movie duration are obtained from existing data, the brightness of picture, and the color temperature of picture are obtained based on statistical models of picture pixels, and other attributes of the input movie are assessed by deep learning model analysis.

5. The method of claim 1, wherein summarizing the plurality of input movies based on matching and integrating the attributes assessed for each input movie further comprises:
matching and integrating the plurality of input movies, shot clips, and frames based on the movie property, the frame property and the short clip property analyzed for each input movie.

6. The method of claim 5, further comprising:
matching and integrating the plurality of input movies, short clips, and frames by matching the short clip property, the frame property, and character property based on temporal relationship, spatial relationship, and character relationship, to obtain attributes of a frame or attributes of a character for downstream analysis.

7. The method of claim 6, further comprising:
matching temporal attributes of the short clips with the frame images, based on time and frame extracting rate, to integrate the frame images with short clips and input movies; and
matching spatial attributes of the short clips with the frame images, based on spatial locations of characters and objects.

8. The method of claim 7, further comprising:
when common landmarks exist between the short clips and the frame images, matching the spatial attributes of the short clips with the frame images by nearest neighbor algorithm; and
when detection areas exist between the short clips and the frame images with no common landmarks, matching the spatial attributes of the short clips with the frame images by calculating overlapping area between the detection areas.

9. An apparatus for implementing a method for movie and television series video data analysis, comprising:
one or more processors; and
a memory configured to store instructions executable by the one or more processors;
wherein the one or more processors, upon execution of the instructions, are configured to:
gather and read, by the one or more processors, a plurality of input movies;
remove a video border of each input movie, wherein the one or more processors configured to remove the video border of each input movie are further configured to:
in response that no video border is to be removed for an input movie, determine, by default, that full screen of the input movie comprises movie information; or
in response that the video border is to be removed for the input movie, remove the video border of the input movie with a dedicated machine learning model;
split the input movie into short clips, based on accuracy and efficiency requirements of different analyzing models, wherein each short clip comprises one complete and continuous video shot;
extract, from the plurality of input movies, frame images according a preset frame extracting rate, wherein splitting the input movie into short clips and extracting the frame images are independently performed;
assess attributes of each input movie by analyzing, with the different analyzing models, the input movie, the short clips cut from the input movie, and the frame images extracted from the input movie, wherein the attributes of the input movie comprise movie property, short clip property and frame property; and
summarize the plurality of input movies based on matching and integrating the attributes assessed for each input movie.

10. The apparatus of claim 9, wherein the different analyzing models comprises statistical analysis models, or deep learning models.

11. The apparatus of claim 9, wherein the one or more processors are further configured to:
match and integrate the plurality of input movies, short clips, and frames based on the movie property, the frame property and the short clip property analyzed for each input movie, by matching the short clip property, the frame property, and character property based on temporal relationship, spatial relationship, and character relationship, to obtain attributes of a frame or attributes of a character for downstream analysis.

12. The apparatus of claim 11, wherein the one or more processors are further configured to:
match temporal attributes of the short clips with the frame images, based on time and frame extracting rate, to integrate the frame images with short clips and input movies; and
match spatial attributes of the short clips with the frame images, based on spatial locations of characters and objects.

13. The apparatus of claim 12, wherein the one or more processors are further configured to:
when common landmarks exist between the short clips and the frame images, match the spatial attributes of the short clips with the frame images by nearest neighbor algorithm; and
when detection areas exist between the short clips and the frame images with no common landmarks, match the spatial attributes of the short clips with the frame images by calculating overlapping area between the detection areas.

14. A non-transitory computer readable storage medium, comprising instructions stored therein to implement a method for movie and television series video data analysis, wherein, upon execution of the instructions by one or more processors, the instructions cause the one or more processors to perform acts comprising:
gathering and reading, by a processor, a plurality of input movies;
removing a video border of each input movie,
wherein removing the video border of each input movie further comprises:
in response that no video border is to be removed for an input movie, determining, by default, that full screen of the input movie comprises movie information; or
in response that the video border is to be removed for the input movie, removing the video border of the input movie with a dedicated machine learning model;
splitting the input movie into short clips, based on accuracy and efficiency requirements of different analyzing models, wherein each short clip comprises one complete and continuous video shot;
extracting, from the plurality of input movies, frame images according a preset frame extracting rate, wherein splitting the input movie into short clips and extracting the frame images are independently performed;

assessing attributes of each input movie by analyzing, with the different analyzing models, the input movie, the short clips cut from the input movie, and the frame images extracted from the input movie, wherein the attributes of the input movie comprise movie property, short clip property and frame property; and summarizing the plurality of input movies based on matching and integrating the attributes assessed for each input movie.

15. The non-transitory computer readable storage medium of claim 14, wherein the different analyzing models comprises statistical analysis models, or deep learning models.

16. The non-transitory computer readable storage medium of claim 14, wherein the movie property comprises movie title, frame rate, movie duration, or vocal detection;

the short clip property comprises short clip length, starting time, camera movement, camera scale, vocal detection, brightness of picture, color temperature of picture, classification of scene location, or light flow of key character or background; and the frame property comprises scene sentiment, identity of character, facial expression of the character, facial landmarks of the character, human body landmarks of the character, motion detection, or human body segmentation of the character.

17. The non-transitory computer readable storage medium of claim 14, wherein summarizing the plurality of input movies based on matching and integrating the attributes assessed for each input movie further comprises:

matching and integrating the plurality of input movies, short clips and frames, for downstream analysis, based on the movie property, the frame property and the short clip property of each input movie, by matching the short clip property, the frame property, and character property based on temporal relationship, spatial relationship, and character relationship.

18. The non-transitory computer readable storage medium of claim 17, wherein upon execution of the instructions by one or more processors, the instructions cause the one or more processors to further perform:

matching temporal attributes of the short clips with the frame images, based on time and frame extracting rate, to integrate the frame images with short clips and input movies; and matching spatial attributes of the short clips with the frame images, based on spatial locations of characters and objects.

* * * * *